Oct. 8, 1968  E. W. LEWIS ET AL  3,404,723
METHOD FOR PRODUCING DENTAL MOLDS OR MOLDING MATERIAL
Filed Feb. 25, 1966  2 Sheets-Sheet 1
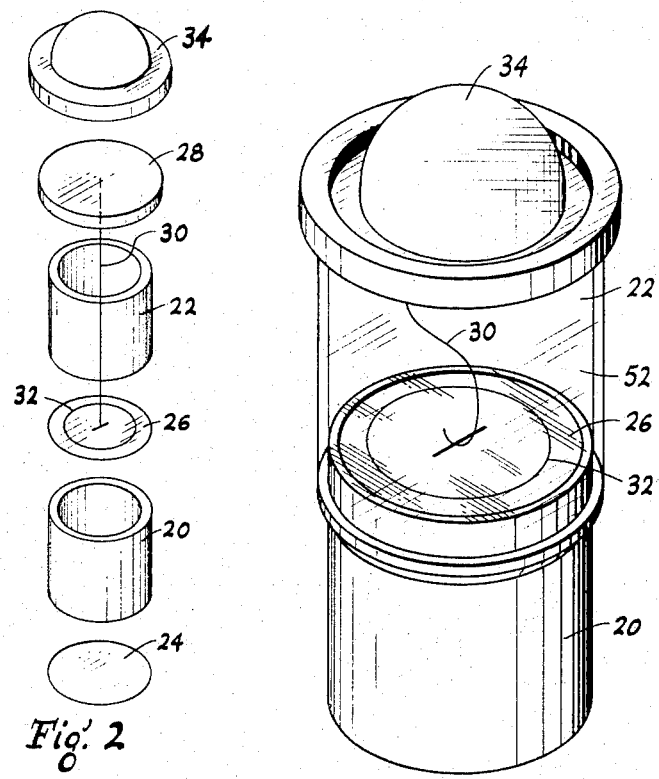
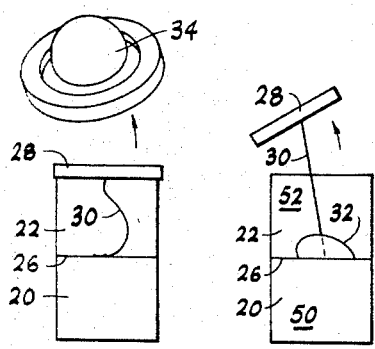
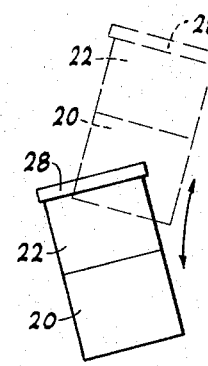
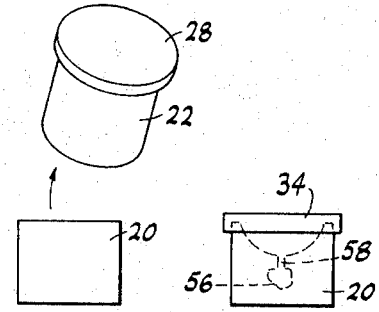
INVENTORS
Eugene W. Lewis
Fuller Warden
Jack H. Mills
Bernard F. McNickle
BY
ATTORNEY William S. Dorman Oct. 8, 1968  E. W. LEWIS ET AL  3,404,723
METHOD FOR PRODUCING DENTAL MOLDS OR MOLDING MATERIAL
Filed Feb. 25, 1966  2 Sheets-Sheet 2
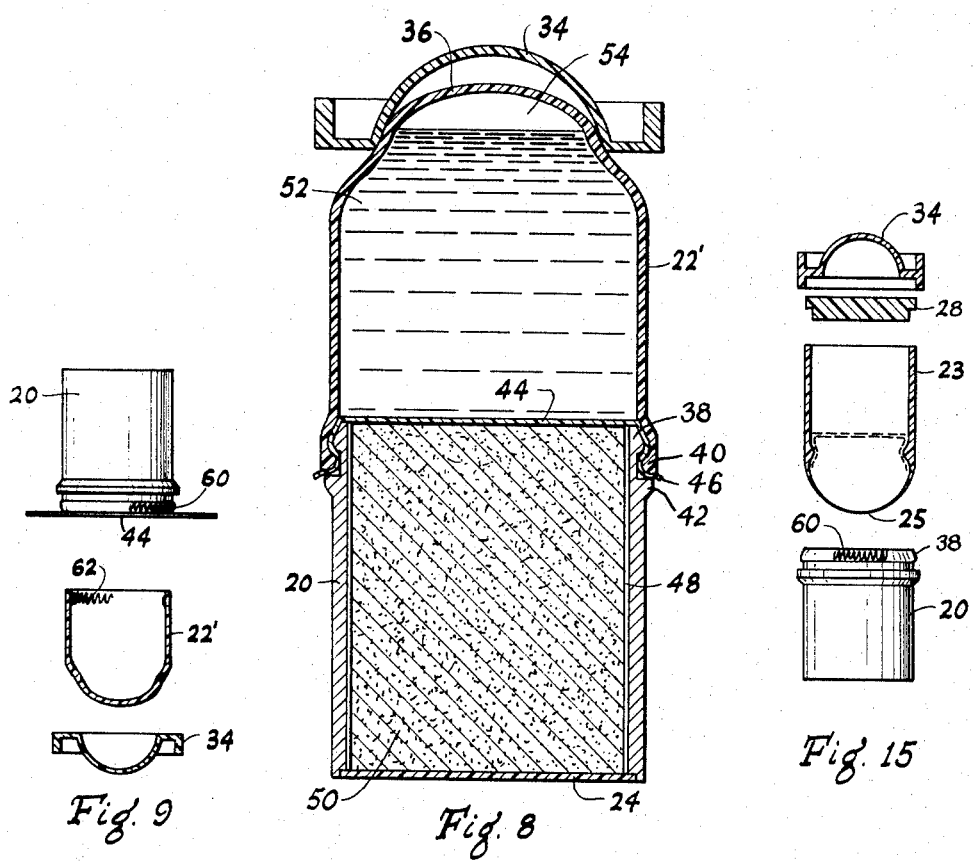
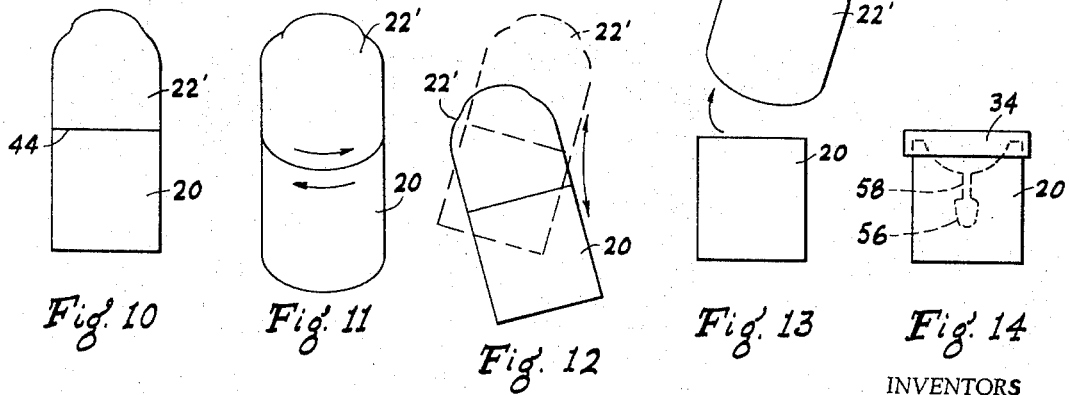
INVENTORS
Eugene W. Lewis
Fuller Warden
Jack H. Mills
Bernard F. McNickle
ATTORNEY William S. Dorman

United States Patent Office 3,404,723
Patented Oct. 8, 1968

3,404,723
METHOD FOR PRODUCING DENTAL MOLDS OR MOLDING MATERIAL
Eugene W. Lewis, Fuller Warden, Jack H. Mills, and Bernard F. McNickle, all of 3233 E. 31st St., Tulsa, Okla. 74105
Filed Feb. 25, 1966, Ser. No. 530,196
4 Claims. (Cl. 164—34)

ABSTRACT OF THE DISCLOSURE

This disclosure relates to a method of producing dental molds wherein a powder is compacted into one part of a container to eliminate entrained air and a liquid is placed in a separate part of the container with a rupturable membrane separating the parts. The membrane is later ruptured and the container with liquid-powder mixture is agitated to produce a homogeneous mixture from which the mold is then formed and molten metal is cast into the mold.

---

The present invention relates to a novel package containing the ingredients or components required for preparing a dental mold and, at the same time, to a novel method of preparing the mold utilizing the components of the package. More particularly, this invention relates to an improved package and method for investing a dental wax pattern so as to form a mold from which dental castings are made, such as, from precious metals, especially gold and gold alloys. As will appear hereinafter, the unique package includes all of the components and materials required for such a procedure. The present invention includes numerous improvements over the prior art methods and packages both as regards convenience and desired results.

In order to appreciate the improvements made and claimed by this invention, the generally accepted prior art method in use should be reviewed.

First of all, the dentist or dental laboratory technician prepares a wax pattern which conforms in size and shape to the dental inlay or crown ultimately desired. The procedures involved in preparing the wax pattern are considered conventional and will not be further described herein. Now, a short sliver of wax, commonly referred to as a sprue, is fused at one end to the wax pattern and at its other end to the top of a dome-shaped member which is called a sprue former and which is made of metal or rubber. At this point, the wax pattern is suspended above the center of the dome on the end of the sprue. A hollow, open-ended cylinder, referred to as a casting ring or an investment ring is next lined with sheet asbestos for the purpose of allowing the mold or investment to expand, as will hereinafter appear. One of the ends of the investment ring is placed over the sprue former so as to rest against a horizontal flange thereon surrounding the bottom of the dome. Now, the dome is received within the lower end of the investment ring and the wax pattern is supported within the investment ring above the dome.

Before discussing the prior art steps of mixing investment powder and water, it should be pointed out that there are different types of dental castings, some of which need varying degrees of expansion to fit over teeth while others require varying degrees of contraction to fit into teeth. Each of these types of castings requires a different powder-water ratio in the investment mix in order to obtain the desired amount of expansion of the investment. To insure the desired accuracy for all types of castings, the weight of the powder and the volume of the water must be measured precisely. This desired accuracy is often not achieved because of the inconvenience involved in properly proportioning the ingredients. The ingredients are then placed in a mixing bowl and mixed to a creamy consistency either by hand spatulation or by a power unit. The resulting mix is placed in the investment ring, which is supported on the sprue former as described above, and the assembly is either vibrated or vacuumed, or both, by machines for the purpose of attempting to remove the undesirable air content from the mix. During the latter step, the sprued wax pattern and sprue former are vibrated into the investment within the ring so that there are no voids in the investment surrounding the wax pattern. After the vibration step has been completed, the investment is allowed to set to a hard mass. After set, the sprue former and sprue pin are removed, and the ring placed in a furnace to eliminate wax and to expand the investment. Now, molten gold or molten gold alloy is poured into the resulting cavity in the investment generally by means of a centrifugal casting technique. After the casting procedure, the casting with its attached sprue and button of excess gold are removed from the investment ring and freed from the investment material. Any adhering investment material is removed from the ring and the ring is further cleaned for later use.

There are numerous disadvantages in the prior art procedures outlined above. First of all, the above-described method is time-consuming in that there are a number of detailed operations involved and, further, there is a considerable amount of time lost in the preparation and clean-up of the materials and tools. Secondly, casting rings and sprue formers are used over and over again for many casting operations until they become unserviceable and need replacement. Repeated use of the rings is undesirable because they become black and rusty from oxidation and their metallic oxides reduce the purity of the metal castings. An excess of metal, usually gold, is used in the casting procedure and this excess metal also becomes contaminated by these impurities from the investment rings. Also, the metal buttons are further contaminated by repeated use of the sprue formers which become coated with wax and investment from previous uses.

Another important disadvantage of the prior art method involves the failure to correctly proportion the investment ingredients. Because gold shrinks 1.25% at the time of casting, it is necessary for the casting investment to expand a predetermined amount. Two types of expansion, setting and thermal, occur and the amount of each is controlled by the accurate proportioning of the powder and water ingredients in the investment. In the prior art method in use, there is no simple way provided to proportion the ingredients so that the desired expansion for a particular casting can be assured. Variations in the mineral content of the water in different localities also affects the amount of expansion of the investment.

Finally, the most significant disadvantage of the prior art method involves the problem of air content in the mix because air causes porosity in the set investment and porosity, in turn, produces surface irregularities on the castings. In the prior art method, the investment powder inherently includes a certain amount of air to begin with, and bowl spatulation causes further incorporation of air in the mixed investment. In an attempt to remove some of the air from investment mixes, it has become customary to vibrate the mixed investment on a vibrating machine, but this procedure alone is capable of removing only a small amount of air. On the other hand, most dental laboratories are equipped with vacuum machines which can be used in conjunction with the vibrating machines to void the mix of as much air as possible. However the vacuuming process disturbs the water-powder ratio by removing moisture from the mix. For practical reasons, few dentists are equipped with vacuum machines, and, therefore, have no adequate way of solving the problem by themselves.

Leading up to the present invention, it was discovered by the inventors herein that it is possible to express air from the investment powder by mechanical compression so as to remove considerably larger quantities of air than has been accomplished by vibration and/or vacuuming. For example, the investment powder itself can be purchased in bulk or in pre-weighed packages. At any event 50 grams of the aforementioned powder will occupy about 50 cc. of volume; this volume is not diminished appreciably by vibration and/or vacuuming. On the other hand, if the same 50 grams of powder is compressed mechanically, for example, by tamping, the volume can be reduced to about 30 cc., which means that 20 cc. of air have been expressed from 50 grams of investment powder.

Therefore in accordance with one of the features of the present invention approximately 50 grams of investment powder are mechanically compressed by any suitable means into an open ended metallic cylinder which will conform generally in size and shape to the investment ring previously described for reasons which will hereinafter appear. This metallic cylinder will be sealed at the lower end by a plastic disc. The internal volume of the metallic cylinder is preferably about 30 cc. in this instance so as to be filled with approximately 50 grams of compressed investment powder. Thereafter the open end of the filled metallic cylinder is covered by a thin plastic membrane. A second generally cylindrical member, preferably of plastic material, and open at one end is filled (or more properly, almost filled) with a measured volume of water. The metallic cylinder and the plastic cylinder are then fitted together with the open end of one telescopically overlapping the open end of the other in a pressure-tight fit with the membrane forming a barrier between the powder and the liquid. At this point we have a metallic container which is filled with a pre-determined weight of investment powder and a superimposed pre-measured quantity of water separated from the powder by means of the membrane. A small quantity of air will be in the upper closed end of the plastic cylinder member above the water to provide a small amount of room for mixing as will hereinafter appear. The manner in which the metallic cylindrical member and the plastic cylindrical member are fitted together will be described hereinafter in greater detail. A dome shaped member of plastic material fits snugly over the top of the plastic container and will serve as a sprue former as will hereinafter appear.

When it is desired to use the above package to prepare a properly proportioned investment mix, the diaphragm is ruptured and the package containing both the water and the powder is vigorously agitated in a mechanical mixer (similar to that used for shaking cans of paint) for a sufficient period of time, generally about 10 to 20 seconds, to provide thorough and adequate mixing of the powder and water. The rupturing of the diaphragm can be accomplished in several different ways, for example, by the use of a tear strip where the upper end of the plastic cylinder is provided with a removable cap with a cord connecting from the cap to the tearable portion of the diaphragm; thus, at the time of intended use the removable cap is removed, tearing the membrane; the torn portion is removed from the cap and the cap is re-seated prior to the mixing step; another way of providing a frangible diaphragm is to attach one peripheral portion thereof to the plastic cylinder and another peripheral portion thereof to the metallic cylinder; then, at the time of intended use of the package, one cylinder is rotated relative to the other and the membrane is torn. After the mixing step is completed, the plastic cylinder is removed and can be discarded. The metallic cylinder now is filled with a properly proportioned and homogeneous mixture of powder and water.

Continuing on with the description of the use of the above package, the dome shaped member has already been removed prior to the mixing step and the wax pattern is mounted on this dome shaped member in exactly the same manner in which the wax pattern is mounted on the sprue former in accordance with the practices of the prior art. The wax pattern and plastic dome assembly is inverted and dipped into the upper end of the metallic cylinder which now contains the properly proportioned investment mix; prior to dipping the wax pattern into the investment mix it may be desirable to spray the wax pattern with a thin layer of some material which will facilitate the ultimate conformation of the investment mix around the wax pattern; also it may be desirable to dope the wax pattern with some of the invention mix itself using a small paint brush. At any event, after the wax pattern is immersed in the investment mix, the resulting assembly may be then vibrated to lessen the possibility of voids between the wax pattern and the investment mix. Thereafter, the investment mix is allowed to harden and the remaining practices of the prior art are generally followed to produce the ultimate casting. In the heating step, which is utilized in the prior art, the bottom on the metal cylinder will volatilize or burn out as will the wax pattern, the wax sprue and the plastic dome. It may be desirable, however, to remove the plastic dome and/or wax sprue prior to the heating step. After the casting step, the investment is removed from the investment ring, as before, and the casting is detached from the gold button and the gold sprue, as before. However, the metallic cylinder can be discarded. If desired, the above process can be carried out wherein the metallic cylinder is lined with a sheet of asbestos material and this matter can be taken care of in the pre-packaging arrangements.

In light of the above discussion, the advantages of the present invention become obvious. First of all, there is no need to weigh powder or to measure a pre-determined volume of water. In this regard it might be pointed out that a given package could be marked or color coded to indicate different expansion properties of the resulting mix to meet the varying demands of the type of casting involved. The resulting mix of the present invention is sufficiently low in air content as to obviate the vacuuming step of the prior art. The mixing of the powder in a separate vessel is also avoided, as is the cleaning of the vessel and any instruments necessary for the mixing. The cleaning of the investment ring and the sprue former is also avoided because these items are discarded. Also, since the investment ring and the sprue former are not used repeatedly, the gold is not contaminated by metallic oxides or other impurities. Another advantage of the present invention results from the fact that most of the air has been removed from the powder so that a denser and more reproducible casting is achieved and the possibility of voids is lessened.

Therefore it is a principal object of the present invention to provide a novel dental package and method of using the same as set forth above which eliminates the need for measuring quantities of investment powder and water prior to the mixing of the same.

It is another object of the present invention to provide a novel dental package and method of using the same as set forth above which eliminates the need for mixing the investment powder and water in a separate vessel prior to placing the mix in the investment ring.

It is another object of the present invention to provide a novel dental package and method of using the same as set forth above which achieves a consistently good mix without the necessity of vacuuming.

It is another object of this invention to provide a unique and novel association of all the parts, tools, materials and ingredients used to prepare dental wax patterns for casting into one complete, disposable and all purpose package.

It is also an object of this invention to provide a unique and novel package in which both of the investment ingredients, powder and water, are contained within the package.

It is a further object of this invention to provide a unique and novel package in which the investment ingredients, powder and water, are separated from each other in sealed compartments until ready for use.

Still another object of this invention is to provide a unique and novel package in which the powder and water ingredients can be joined together in a quick and easy fashion when ready for use.

It is another object of this invention to provide a unique and novel package in which the package itself serves as the mixing container of the investment mix.

It is also an object of this invention to provide a unique and novel package which contains the investment ingredients, powder and water, in their exact proportions, weights and volumes.

It is also another object of this invention to provide a unique and novel package which contains the investment ingredients, powder and water, in different sets of proportions or ratios to comply with different degrees of desired expansion in the set investment. Such packages can be color coded or marked in some such manner to indicate the particular degree of expansion or contraction the would result from the use of such a package.

Still a further object of this invention is to provide a unique and novel package, a portion of which contains 50 grams of investment powder that has undergone the removal of the equivalent of approximately 20 cubic centimeters of air from its volume and sealed in this state at the time of packaging.

It is also an object of this invention to provide a unique and novel package, the ingredients of which can be thoroughly mixed in a closed system without the incorporation of air.

Still another object of this invention is to provide a unique and novel package a portion of which serves as the container for the inventment powder, then becomes the container for the mixed investment, finally converting itself into a disposable casting ring.

A further object of this invention is to provide a unique and novel package, a portion of which serves as a disposable sprue former.

It is also an object of this invention to provide a unique and novel package in which the contents and parts can be utilized for a single investment operation after which the remaining portions can be discarded in favor of a complete new unit.

It is also an object of this invention to provide a unique and novel package that, by virtue of the provision of clean new parts and materials for each investing and casting procedure, more accurate and cleaner castings, sprues and buttons of excess metal result.

Another object of this invention is to provide a unique and novel package which will give the user high quality casting results through controlled and automatic accuracy of the mixing method.

Other and further objects and advantageous features of the present invention will hereinafter more fully appear in connection with the detailed descriptions of the drawings in which:

FIGURE 1 is a perspective view of a novel dental package prepared in accordance with one embodiment of this invention;

FIGURE 2 is a semi-diagrammatic and exploded view of the component parts of the package in FIGURE 1;

FIGURES 3 to 7 inclusive constitute a series of semi-diagrammatic illustrations showing the employment of the package of FIGURE 1 in the novel method of the present invention;

FIGURE 8 is a sectional view of a novel dental package made in accordance with another embodiment of the present invention;

FIGURE 9 is an exploded view of the components of the package of FIGURE 8;

FIGURES 10 to 14 inclusive constitute a series of semi-diagrammatic illustrations showing the embodiment of the package of FIGURE 8 in the novel method of the present invention; and FIGURE 15 is a semi-diagrammatic exploded view of a package made in accordance with a still further embodiment of this invention.

Referring to the drawings in detail, FIGURE 1 shows a lower cylindrical metallic member 20 and an upper plastic cylindrical member 22. The lower end of the cylindrical member 20 is sealed by a plastic disc 24 (see also FIGURE 8). A rupturable diaphragm 26 is sealed against the upper end of the cylinder 20 by suitable glue or cement after the cylinder 20 has been filled with compacted investment powder as will hereinafter appear. A cap 28 (not shown in FIGURE 1) is adapted to engage the top of the plastic cylinder 22 in a fluid-tight relationship. A suitable cord 30 of plastic or fabric material is attached at its upper end to the inside surface of the cap 28 and at its lower end to the central portion of the diaphragm 26 by any convenient means. The diaphragm is scored along the line 32 to provide a weakened portion on the membrane 26 such that, when an upward pull is exerted on the cord 30, the central circular portion of the membrane will be ruptured along the score line 32. A hollow semi-spherical dome 34 is adapted to fit snugly on the top of the plastic cylinder 22 above the cap 28.

As shown in FIGURE 8, the lower cylindrical metallic member 20 is the same as the corresponding cylindrical member 20 in FIGURE 1 and is provided with the same plastic disc 24 sealing the lower end thereof. The upper plastic cylindrical member 22' is shaped somewhat differently from its counterpart 22 in FIGURE 1 in that the upper end is closed and is provided with a semi-cylindrical proturberance 36 adapted to fit inside the dome shaped member 34 to hold the latter in a snug fit over the top of the plastic member 22. FIGURE 8 shows the intermating relationship between the upper and lower cylinders in somewhat greater detail than in FIGURE 1. The upper end of the metallic cylinder 20 is provided with an outwardly extending lip 38 and a lower end of the plastic cylindrical member 22' (as also would be the case with the plastic member 22) is provided with an inwardly directed lip 40 which cooperates with the lip 38 to provide a fluid-tight seal when the member 22 is telescoped over the lower member 20. An outwardly projecting shoulder 42 is provided on the cylindrical member 20 as a stop to prevent further downward movement of the member 22 beyond that shown in FIGURE 8. The shape of the lips 38 and 40 are (and indeed their presence) is not critical as far as the present invention is concerned just so long as the upper plastic member 22' (or 22) is adapted to fit snugly against the top of the lower cylindrical member 20 as shown in FIGURE 8.

A diaphragm 44 is shown in FIGURE 8 resting against the top of the metallic cylindrical member 20 and also downwardly between the intermating portions of the members 22' and 20 extending somewhat outwardly as at 46. The diaphragm 44 is somewhat different from the diaphragm 26 and it is also connected to the members 20 and 22' in a manner different from that decribed above in connection with the diaphragm 26. Furthermore the diaphragm 44 is not provided with a scored line 32 nor with a tear tab 30 such that the need for the cap 28 is eliminated in the embodiment shown in FIGURE 8.

Prior to filling the metallic cylinder 20 with investment powder it may be desirable to cover the inside surface with a thin layer 48 of asbestos material to compensate for expansion of the investment and also to provide a path of escape for any gases that are generated during the heating and casting steps; to the extent that this strip 48 might be considered as a spacer for investment expansion, the use of this asbestos sheeting may be eliminated because the cylindrical member 20, being of a thin and disposable nature, may allow for adequate expansion by itself.

A quantity of investment powder is compacted into the interior of the cylindrical member 20 by compression; if the compression forces are sufficiently complete and/or uniform the amount of powder 50 contained within the cylinder 20 will be the same in each case because the internal volume of the cylinder 20 will be constant. However, the cylinder 20 can be weighed before and after filling with the powder 50 to insure an accurate quantity of powder therein. Heretofore attempts have been made to eliminate the air from the powder mix by means of agitation and/or vacuuming by the employment of machines designed for these purposes. However, it has been discovered that either or both of these expedients have been largely unsuccessful in removing the air from the powder as desired. The powder itself can be purchased in bulk form or in preweighed package generally containing about 50 grams. These 50 grams generally occupy about 50 cc. of volume. By using mechanical compression on the powder it has been discovered that a 50 gram sample, which would normally occupy approximately 50 cc. of volume, can be compressed to about 30 cc of volume which means that about 20 cc. of air has been removed.

Returning now to consideration of FIGURES 1 and 2 it will be assumed that the container 20 has been filled with compacted investment powder as described above. Naturally the lower disc 24 will be snugly in place. At this point an adhesive material can be placed on the top edge of the cylinder 20 or around the side adjacent the lip 38. The diaphragm 26 is positioned over the top of the cylindrical container 20 so that the scored portion 32 is centrally located. The diaphragm is pushed down against the adhesive portion with a certain amount of the diaphragm overlapping beyond the edge of the cylindrical member 20. At this point the upper cylindrical member 22 is pushed downwardly in a telescoping relation with respect to the cylindrical member 20 so as to produce the effect shown in FIGURE 8. Any part of the diaphragm 26 which extends outwardly beyond the joint is cut off as at 46. With the cover 28 removed and without any tension on the cord 30 a predetermined quantity of water 52 is poured into the upper member 22. The plastic cylinder 22 is generally completely filled with water, but the provision of a slight space 54 (see FIGURE 8) is not detrimental. After the desired quantity of water is placed within the upper cylindrical member 22 the cap 28 is fitted snugly in place and the semi-spherical member 34 is superimposed on the cap 28. The package of FIGURE 1 filled with a predetermined quantity of investment powder and with a predetermined quantity of water, these components being separated from each other by virtue of the diaphragm 26, can be distributed as such to dentists and dental laboratory technicians.

In using the package of FIGURE 1 in accordance with the method of the present invention, the dome shaped member 34 is first removed as shown in FIGURE 3. This semi-cylindrical dome shaped member 34 becomes a sprue former and a wax pattern 56 is attached to the upper part of the dome by means of a wax sprue 58 in a manner consistent with the practices of the prior art. (As diagrammatically illustrated in FIGURE 7.)

As shown in FIGURE 4 the cap 28 is removed from the top of the cylindrical member 22 and, in so doing, a sufficient pull is exerted on the cord 30 as to rupture the diaphragm 26 along the score line 32. The cap 28 is pulled out further and the cord 30 and an adhering portion of the diaphragm are severed from the cap 28.

As shown in FIGURE 5 the cap 28 is again placed over the top of the plastic cylindrical member 22 in sealing relation therewith and the mixture is vibrated vigorously preferably using some type of machine such as that commonly used for the mixing of paints or for a similar machine which could be designed specifically for the purposes of the present invention. After this shaking continues for a short period of time, generally in the order of 10 to 20 seconds, the investment powder is thoroughly and uniformly mixed with the water to form a homogeneous investment mix. Following the procedures outlined above, it has been discovered that this homogeneous mix occupies substantially the volume of the lower metallic cylindrical member 20.

As shown in FIGURE 6 the plastic cylindrical member 22 and cover 28 are removed from the lower cylindrical member 20 and are discarded. In the meantime, the wax pattern 56 has been attached to the sprue former 34 by means of the sprue 58 in accordance with the practices of the prior art. The sprue former 34 is inverted as shown in FIGURE 7 and the wax pattern and sprue and sprue former are imbedded in the mixed investment contained within the cylindrical member 20. Prior to imbedding the wax pattern in the investment mix it may be desirable to spray the wax pattern 56 with a thin layer of some solution containing a wetting agent, or alternatively, it may be desirable to dope the wax pattern by coating the same with investment material from the container 20 using a small paint brush or the like. At any event, the wax pattern 56, sprue 58, and sprue former 34 are inserted into the interior of the container 20 as shown in FIGURE 7 and the assembly can be further vibrated to lessen the possibility of voids between the wax pattern 56 and the investment mix and to insure a good conformation of the investment material around the wax pattern 56. After the investment material has set as a result of the hydrating action between the water and the investment powder, the metallic ring containing the wax pattern and investment is placed in a furnace.

During the heating step in the furnace, the plasic disc 24, the sprue former 34, sprue pin 58 and the wax pattern will all be volatilized or burned out. After set, and after baking, the metallic cylindrical member 20 will contain a body of investment material therein having a cavity conforming in size and shape to that of the desired dental casting. At this point the metallic cylindrical member 20 is placed in a casting machine, generally of the centrifugal type, where gold is allowed to flow into the resulting cavity. After the casting step the investment can be removed from the cylinder 20 and the investment material can be broken away from the gold pattern, sprue and button in accordance with the practices of the prior art. The gold button and sprue are removed from the gold pattern also in accordane with the practices of the prior art. At this point the metallic cylindrical member 20 can be discarded because each new package has its own metallic cylindrical member 20.

Referring now to FIGURES 8 and 9 a somewhat different technique in assembly must be employed. After the cylindrical member 20 has been filled with compacted investment powder 50, the diaphragm 40 is placed over the top and held in position while the cylindrical member 20 is inverted as shown in FIGURE 9. Any convenient means can be employed to hold the membrane 40 in this position during the assembly. At this point a quantity of adhesive material 60 is applied to the outer surface of the lip 38 for approximately 180°; at the same time a second quantity of adhesive material is placed on the inside of the plastic member 22 generally inwardly of the lip 40 and also for approximately 180°. When considering the ultimate juncture the 180° portion of adhesive 60 is opposite from the 180° portion of adhesive 62. Thereafter, the cylindrical member 22 is urged downwardly and into the plastic container 22 forcing the diaphragm 44 upwardly against the lip 38 and at the same time against the inside of the plastic container 22'. Thus the membrane 44 adheres to the adhesive portion 60 and to the adhesive portion 62. It must be noted now that one portion of the diaphragm 44 is connected adhesively to the metallic container 20 and another portion, namely, the remaining 180° portion, is adhesively connected to the plastic container 22'. During the aforementioned assembly, it is preferable that the botom portion of the plastic container 22', as it appears in FIGURE 9, should be compressed slightly so as to reduce the volume thereof in order to compensate for the compression resulting from the combination of the two members. After the assembly has been completed however and the pressure is released from against the bottom of the plastic member 22', it can return to its original volume and thus the compressive force is fully compensated. Naturally if the assembly takes place in an evacuated or partially evacuated area, no concern need be given to any deliberate squeezing of the outer end of the plastic member 22'.

After the plastic container 22 has been placed on the metallic container 20 as illustrated in FIGURE 9 and as described above, the assembly is inverted to the position shown in FIGURE 8 and the dome-shaped member 34 is placed on the top of the plastic member 22'. The resulting package shown in FIGURE 8 is now ready for distribution to dentists or dental technicians. The method of employment of the package shown in FIGURE 8 is similar in some respects to that described above in connection with the package of FIGURE 1 except as far as the rupturing of the diaphragm is concerned.

Referring now to FIGURES 10 to 14 the dome shaped member 34 is removed from the top of the plastic member 22' so as to prepare a separate mounting for the wax pattern 56 using the wax sprue 58; thus Figure 10 merely represents the package of Figure 8 with the dome shaped member 34 removed. Since a portion of the diaphragm 44 is attached to the plastic member 22 and a portion thereof is attached to the metallic cylinder 20, it should be apparent that a relative twisting action between the two members will cause a rupturing of the diaphragm, thereby joining the ingredients without violating the closed container system. Accordingly. FIGURE 11 represents a condition where the plastic member 22 is rotated relative to the lower metallic member 20 thereby causing the diaphragm 44 to rupture. There is no need to separate any cover in order to tear the diaphragm.

FIGURE 12 is similar to FIGURE 5 in that this figure merely represents the step of mixing by agitation. As was the case with Figure 5, the assembly is placed in a machine similar to that employed for shaking paint cans and this assembly is vibrated for a sufficient period of time, generally in the neighborhood of 10 to 20 seconds, until a homogeneous mixture of water and powder is achieved.

Figure 13 merely represents the removal and discarding of the plastic container 22'.

FIGURE 14 for all intents and purposes is the full equivalent of FIGURE 7 and the remarks relative to the description of FIGURE 7 should be considered in connection with the illustration in FIGURE 14. The same identical steps are employed as far as imbedding the wax pattern in the investment mix within the container 20 in FIGURE 14. Also the same steps of removing the sprue former 34, heating the assembly and casting are repeated in substantially the same manner as described above in connection with FIGURE 7.

FIGURE 15 shows a modified package similar in many respects to that shown in FIGURE 8 particularly as far as the ultimate rupturing of the diaphragm is concerned. In the case of FIGURE 15 however, the upper plastic cylinder 23 is integral with the diaphragm or membrane 25 such that these two can be cast or molded in a single operation. By virtue of the fact that the portion 25 is considerably thinner than the lateral walls of the plastic cylinder 23, the membrane portion 25 is highly flexible and also rupturable. However, the upper end of the plastic material 23 is open and is sealed by means of a cap 28 as in the case of the embodiment shown in FIGURES 1 and 2. The upper dome shaped member 34 is also similar to that shown in FIGURES 1 and 2 and is received over the upper end of the cap 28 after the latter is placed in position on the plastic cylinder 23. For assembly purposes, the lower cylindrical container 20 having thereon a plastic disc or wafer 24 sealing the lower end thereof is compacted with a premeasured quantity of investment powder as in the case of the embodiments shown in FIGURES 1 and 8. If desired, the asbestos liner 48 can also be employed. A small portion of glue or adhesive 60 is placed on the outer rim 38. The upper plastic cylinder 23 is now lowered down over the top of the metallic cylinder 20 whereupon the membrane 25 first overlies the compacted material in the cylinder 20. Further downward movement of the plastic cylinder 23 will cause outer ends of the membrane 25 to fold upwardly against the inside of the plastic cylinder 23 as shown in dotted lines in FIGURE 15. The ultimate telescopic relationship for the components of FIGURE 15 will be substantially the same as that shown in FIGURE 8 except that the end portion 46 will be eliminated because the membrane 25 is integral with the side walls of the plastic cylinder 23. After the plastic cylinder has been placed upon the lower metallic cylinder 20 in the manner described above, a premeasured quantity of water is placed in the upper cylinder 23, the cap or cover 28 is sealed against the upper end of the cylinder 23 and the dome shaped member 34 is also placed in position.

With further regard to FIGURE 15, when the time of intended use of the package arrives, the upper and lower members are rotated relative to each other, as in the case of FIGURE 11, the diaphragm 25 is ruptured and the steps similar to FIGURES 12 to 14 are performed on this package of FIGURE 15.

It should be apparent from the above, that many of the steps of the prior art have been eliminated. For example, there is no need to mix investment powder separately and as a result there is no need to clean a separate vessel or any of the implements necessary for the mixing action. There is no need to attempt to apply a vacuum to remove air from the powder because this has already been done by the compacting process. There is no need to pour the mixed investment from the mixing vessel into the investment ring because the mixing vessel and the investment ring are one and the same in the present invention. There is no need to clean a sprue former or investment ring because these are discarded in the process. Because the investment ring is not reused, there is no danger of contamination of the gold by oxides; also because the sprue former is discarded there is no danger of the gold becoming contaminated by any impurities adhering to the sprue former. It should be obvious that the present method employing the package of the present invention is considerably less time consuming and much more convenient than the method of the prior art.

As indicated heretofore, and depending upon the type of casting, inlay or cap, etc., it may be desirable to vary the expansion characteristics of the investment mix; it is recognized in the prior art that the expansion characteristics of the investment mix are determined largely by controlling the water-powder ratio. Since the present invention provides a means whereby the powder can be accurately measured and the water can be accurately measured, it is within the purview of the present invention to provide various water-powder ratios. Accordingly, the individual packages can be marked or color coded to indicate the type of expansion characteristics of the particular package.

With regard to the materials employed in the packages of the present invention, the term plastic has been employed in connection with the description of the upper cylinder, the lower disc or wafer, the removable cap, and the dome shaped member which ultimately becomes the sprue former. Also, reference has been made to the lower cylindrical member as a metallic container. The term "plastic" has been used particularly in deference to the availability and inexpensive nature of this material. Obviously, any other material having the same characteristics could be employed such that the term "plastic" should not be considered as limiting with respect to the present invention. As far as the "metallic" nature of the lower cylinder is concerned, it is not necessary that this be made out of a thick, expensive piece of stainless steel; a relatively thin cylindrical metal member can be used bearing in mind that it need only stand a single investment and casting operation. It is conceivable, but not likely, that the lower cylindrical member could be made of ceramic material. As far as the diaphragms or membranes are concerned these can be made out of any suitable plastic or cellophane material or the like just so long as they are rupturable in the manner described above and are capable of providing an effective seal between the investment powder and the water until the time of intended use. As far as the investment powder is concerned, this can be any one of several conventional formulations. For further details on the investment powder as well as some of the conventional practices heretofore employed in the casting of investments, attention is directed to "The Science of Dental Materials," by Eugene W. Skinner, Ph.D., third edition, revised, published by W. B. Saunders Company, 1947; the particular description of the investment powders is set forth in the latter book on pages 247 to 262.

It is also recognized that the dentistry profession utilizes other molds or molding materials which are prepared from a powder-liquid mixture. These would include the various plasters, stones, acrylics, alginates, etc. Whereas the liquid-powder mixture is not as critical as that involved in the investment process, nevertheless, it is entirely possible that the packages of the present invention could be utilized in furnishing the dentist or the dental technician preweighed and preproportioned quantities of powder and liquid for any one of the aforementioned molding mixtures as well as any of the ones which have not been specifically mentioned. The package or packages of the present invention also have specific utility in the pharmaceutical and food fields and other related field where it is desired to keep two or more materials separated from each other until the time of intended use; these materials can be solid (powder) or liquid or any combination.

Where the package of the present invention is used for purposes other than the making of the investment mixture, it is unnecessary that one of the cylindrical members be made of metal. In fact, two, three, or four telescopically joined members can be used with a diaphragm between each two adjacent members, in which case all of the cylindrical members can be made of plastic.

It has been discovered also, in connection with the present invention, that membranes of certain materials, or of certain thickness of material, (with or without scoring) will rupture during the shaking action alone, such that the use of the tear tabs or torsional twisting as described above can be eliminated.

Whereas the present invention has been described in particular relation to the drawings attached hereto, it should be understood that other and further modifications, apart from those shown or suggested herein, may be made within the spirit and scope of this invention.

What is claimed is:
1. A method of investing a dental wax pattern from which dental castings are formed which comprises the steps of establishing a powder zone surrounded by a metallic envelope open at two opposite ends thereof, sealing one end of said metallic envelope, compacting a predetermined quantity of investment powder in said powder zone to remove substantial amounts of air from said powder while substantially filling said metallic envelope, establishing a closed liquid zone adjacent the other open end of said metallic envelope, covering said other open end of said metallic envelope with a relatively thin and rupturable membrane, said membrane forming a portion of said closed liquid zone, said closed liquid zone containing a predetermined quantity of water, thereafter rupturing said membrane to provide open communication between said two zones, agitating said two zones simultaneously to provide a homogeneous water-powder mixture, separating said second zone from said first zone with said water-powder mixture being contained in said metallic envelope, separately mounting said wax pattern above a support on a wax sprue, immersing said wax pattern so mounted into said water-powder mixture through said other end of said metallic envelope, heating said metallic envelope and contents after said water-powder mixture has set to volatilize said wax pattern, and pouring molten metal into the void created by the volatilized wax pattern to form a dental casting.

2. The method according to claim 1 wherein said support is volatilizable and wherein said support and wax sprue are volatilized together with said wax pattern during said heating step.

3. The method according to claim 1 wherein said support is removed from said metallic envelope prior to said heating step.

4. The method according to claim 1 wherein said one end of said metallic envelope is sealed with a volatilizable material which is volatilized during said heating step.

References Cited
UNITED STATES PATENTS

| | | | |
|---|---|---|---|
| 1,774,258 | 8/1930 | English | 206—47 |
| 2,518,040 | 8/1950 | Mann | 164—34 XR |
| 2,527,992 | 10/1950 | Greenberg | 206—47 |
| 2,773,591 | 12/1956 | Jensen | 206—47 |
| 2,822,592 | 2/1958 | Wendt | 164—35 |
| 2,885,104 | 5/1959 | Greenspan | 206—47 XR |
| 3,052,371 | 9/1962 | Van Bemmelen | 206—47 XR |
| 3,322,187 | 5/1967 | Weissman | 164—34 XR |
| 3,344,914 | 10/1967 | Bloom et al. | 206—47 |

J. SPENCER OVERHOLSER, *Primary Examiner.*

R. S. ANNEAR, *Assistant Examiner.*